May 15, 1951  R. T. EVANS ET AL  2,552,891
TRACTOR ACTUATED LIFT FOR WHEELED DISK HARROWS
Filed May 14, 1948  2 Sheets-Sheet 2

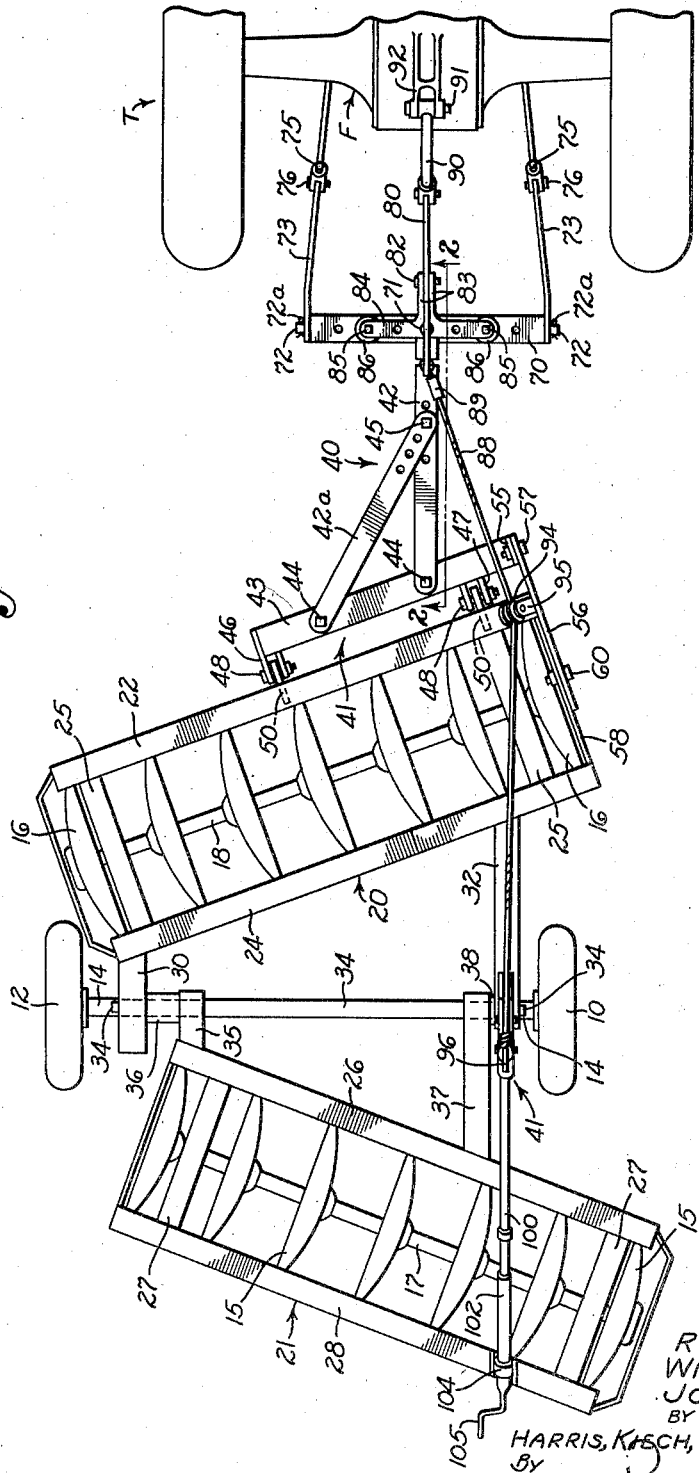
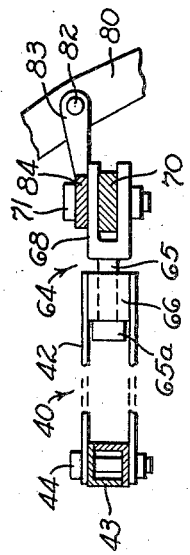

INVENTORS.
RUSSEL T. EVANS
WILLIAM R. EVANS
JOHN H. CLASEN
BY THEIR ATTORNEYS.
HARRIS, KIECH, FOSTER & HARRIS
By

Patented May 15, 1951

2,552,891

UNITED STATES PATENT OFFICE 2,552,891

TRACTOR ACTUATED LIFT FOR WHEELED DISK HARROWS

Russell T. Evans, William R. Evans, and John H. Clasen, Anaheim, Calif.

Application May 14, 1948, Serial No. 26,988

10 Claims. (Cl. 55—73)

This invention relates to earthworking implements, and applies more particularly to apparatus employing discs for working the earth, including a type commonly known as off-set disc harrows or plows where forward and rearward gangs of discs are employed. However, the invention is also applicable to other earthworking tools which use forward and rearward gangs of earthworking tools.

A general object of the invention is to provide a relatively simple structure employing ground wheels which may be relied upon for carrying the weight of the ground engaging tools and incident supporting frames therefor when the implement is to be transported from place to place and when it is to be turned at the end of a field.

Another object of the invention is to provide relatively simple means for use on a harrow or other structure of the indicated type which may be actuated automatically through automatic lifting means commonly employed on tractive vehicles and conventionally controlled by the driver of the tractive vehicle to raise and lower earthworking tools or the like, or portions thereof as required.

A still further object of the invention is to employ automatically actuated means of the indicated character which, at least in part, constitute a portion of hitch means by which the earthworking implement is attached to the tractive vehicle.

Another object is to provide a combination with hitch means by which adjustment of the height of the discs or other tools may be effected, and further means which will automatically provide for incidental rising and falling movement of the discs during normal discing operations. Another object is to provide means for regulating the depth of cut of the discs or other earthworking tools, while at the same time providing for raising and lowering of such tools by the power lift mechanism of the tractive vehicle.

An additional object of the invention is to provide means of the indicated type for disc harrows and similar working implements for lifting rearward and forward earthworking tools wherein rearward and forward frames carrying such tools are hingedly connected together upon a transverse hinge means so that, upon automatic lifting of the tools, their weight is automatically transferred to the ground wheels, and an incidental object is to employ such means whereby a portion only of the weight of the tools is so transferred to the ground wheels through the medium of the power lift upon the tractive vehicle, such partial transfer of weight being effected through control of the power lift by the driver of the vehicle.

Other objects, and the various features, of the invention will become apparent to those skilled in the art upon reference to the following specification and the accompanying drawings wherein one embodiment of the invention is disclosed by way of illustration.

In these drawings:

Fig. 1 shows a top plan view of a harrow constructed in accordance with the present improvement and hitched to the rear end of a tractor equipped with a conventional hydraulic lift device;

Fig. 2 is an elevational detail taken on the line 2—2 of Fig. 1 and showing a portion of the hitch construction on an enlarged scale;

Figure 3:
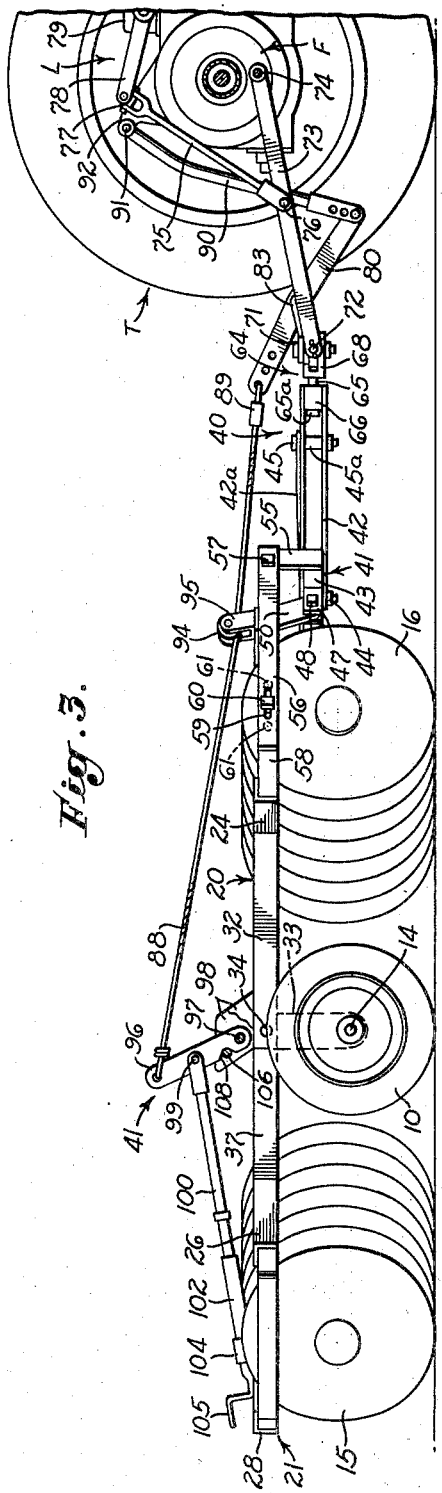
Figure 4:
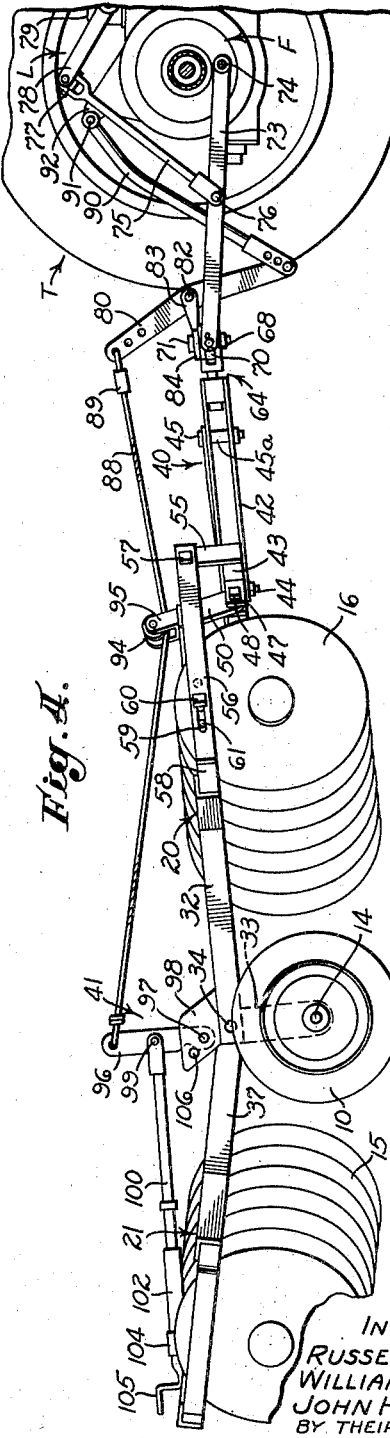

Fig. 3 is a side elevation of the construction shown in Fig. 1 and showing the ground wheels and discs with the discs lowered to engage the surface of the earth; and Fig. 4 is an elevation similar to that of Fig. 3 but illustrating the parts in such relationship as to cause the discs to be elevated from the surface of the earth or a roadway whereby to impose the weight of the harrow upon the ground wheels for the purpose of transportation from one location to another, or for the purpose of turning the harrow without interference of the earth with the discs.

In the form of construction shown, and having reference particularly to Fig. 1, a right ground wheel 10 and a left ground wheel 12 are shown as mounted upon an axle 14 which is adapted to carry a rearward set or gang of earthworking discs 15 and a forward set or gang of earthworking discs 16. As seen, the discs 16 are pitched conventionally toward the right, and the discs 15 are pitched conventionally toward the left, the two sets of discs being arranged in converging relation and laterally offset as illustrated. The discs 15 are shown as being positioned upon a shaft 17, and the discs 16 are shown as being positioned upon a shaft 18, the shaft 18 being appropriately journalled in an angularly disposed forward frame 20, and the shaft 17 being appropriately journalled in an angularly disposed rearward frame 21. The forward frame 20 comprises a front rail 22 and a rear rail 24 appropriately connected by cross bars 25 which carry upon their undersides bracket means suitable to provide journals for the shaft 18. Similarly, the rearward frame 21 comprises a front rail 26, cross bars 27 and a rear rail 28, the cross bars 27 providing means on their undersides for the journalling of the shaft 17.

The forward frame 20 is mounted upon the axle 14 through the medium of a rearwardly extending left arm 30 and a rearwardly extending right arm 32, the rearward ends of these arms being provided on their undersides with depending brackets 33 in which the wheel axle 14 is mounted. The rearward ends of the arms 30 and 32 further are mounted and retained upon the ends of a horizontal hinge shaft 34 disposed above the axle 14 and transversely of the harrow in general parallelism with the axle 14. The rearward disc frame 21 also is mounted upon the shaft 34 by means of a forwardly projecting arm 35, spaced from the arm 30 of the forward frame 20 by a spacing sleeve 36, and by means of a second forwardly projecting arm 37 suitably spaced from the right arm 32 of the forward frame 20 as by a washer 38. The arms 30, 32, 35 and 37 are rigidly mounted on their respective frames 20 and 21. The arms of each of the frames are journalled on the shaft 34 so that the gangs of discs 15 and 16, together with their frames 21 and 20, are hinged with respect to each other and may be moved between a lowered position as illustrated in Fig. 3 and a raised position as illustrated in Fig. 4 where the entire weight of the frames and their discs is transferred to the ground wheels 10 and 12.

The harrow is adapted to be drawn forward, and the forward frame 20 with its forward discs 16 is adapted to be elevated, through the medium of a tongue structure 40 and an automatic power lift L (Figs. 3 and 4) conventionally carried by a tractive vehicle T, while the rearward frame 21 and its discs 15 are adapted to be lifted, upon elevation of the forward portion of the tongue structure 40, by means of an elevating mechanism 41 through the lifting effect produced upon the forward end of the structure 40 when the latter is elevated by the power lift L, as presently to be explained.

The tongue structure 40 comprises a tongue member 42 disposed approximately parallel to the direction of travel, said tongue member 42 being composed of two vertically spaced bars as best seen in Figs. 3 and 4, which are braced in properly aligned position by a bracing arm 42a. The rearward ends of the bars of the tongue member 42 are bolted respectively to the upper and lower sides of a harrow draw bar 43 which may be of square or box-like construction in cross section as best indicated in Fig. 2 where the draw bar 43 is shown as being formed from two angle irons welded together longitudinally. Bolts 44 serve to secure the rearward ends of the bracing arm 42a and the bars of the tongue member 42 to the harrow draw bar 43. For the purpose of securing the forward end of the bracing arm 42a to the tongue member 42 a bolt 45 is employed, a spacer sleeve 45a being positioned about the bolt 45 between the bars constituting the tongue member 42.

The harrow draw bar 43 is secured to the forward frame 20 of the harrow through the medium of suitable ears 46 welded to the left end of the draw bar 43 and similar ears 47 welded adjacent the right end of the draw bar 43. The rearward ends of the ears 46 and 47 are mounted by hinge or pivot bolts 48 upon the lower end of depending brackets 50 whose upper ends are welded to the underside of the front rail 22 of the forward harrow frame 20.

In order that the front gang of discs 16 may be lifted from the position of Fig. 3 to the position of Fig. 4 by the power lift L through the medium of the tongue structure 40, it is necessary that provision be made for some form of rigidity of connection between the tongue structure 40 and the front harrow frame 20 at the time that the front gang of discs 16 is to be lifted. This could be provided by rigidly attaching the harrow draw bar 43 directly to the front rail 22 if it were not for the necessity of providing at the same time for some play which will permit normal rising and falling of the front discs 16 during discing operation. Such play is permitted by the pivot bolts 48 as they act to hinge the harrow draw bar 43 upon the front rail 22. For the purpose of limiting swinging movement of the tongue structure 40 about the pivot bolts 48 when it is desired to lift the discs 16 and the forward frame 20, a lost motion connection is provided between the harrow draw bar 43 and the frame 20. This lost motion connection is in the form of a riser 55 which is rigidly secured to the right end of the draw bar 43, as by welding, and a slide bar 56 extending generally in the direction of travel and having its forward end pivotally mounted upon the upper end of the riser 55 by means of a pivot pin or bolt 57. The rearward portion of the slide bar 56 lies alongside an adjacent end rail 58 of the forward harrow frame 20 and is provided with a short slot 59 receiving an adjustable stop bolt 60 mounted in any one of a plurality of holes 61 in the end rail 58. The head of the bolt 60, being of greater diameter than the width of the slot 59, serves to retain the slide bar 56 in operative relationship. When the tongue structure 40 is lifted by the power lift L on the tractive vehicle T, such tongue structure 40 and the harrow draw bar 43 will swing about the hinge point provided by the pivot bolts 48, and the slide bar 56 will be moved rearwardly along the end rail 58 of the forward harrow frame 20, through the driving action of the riser 55 and the pivot bolt 57, until the forward end of the slot 59 in the slide bar 56 strikes the stop bolt 60. Thereafter, since no further sliding movement of the slide bar 56 can occur, further elevation of the tongue structure 40 causes corresponding elevation of the front discs 16 and the forward harrow frame 20. Such result is occasioned by the effective rigid connection provided when the slide bar 56 is moved to bring the forward end of its slot 59 into contact with the bolt 60. On the other hand, during normal discing operation travel of the slot 59 along the bolt 60 permits the incidental rise and fall of the front discs 16 without affecting the connection of the forward end of the tongue structure 40 to the tractive vehicle T, the necessary movement of the discs 16 with respect to the rearward end of tongue structure 40 taking place about the pivot bolts 48 at the lower ends of the brackets 50.

The forward end of the tongue structure 40 is connected to a conventional lifting and draft means, provided on a tractive vehicle T, through the medium of a swivel joint 64. This swivel joint comprises a swivel pin 65 whose rearward portion rotates in a swivel block 66 secured between the forward ends of the bars constituting the tongue member 42, the pin 65 having a head 65a which engages the rearward end of the block 66 and retains the swivel pin in operative position. The forward end of the swivel pin 65 is provided with a clevis 68 whose bifurcated portions lie against the upper and lower faces of a transversely disposed tractor draw bar 70 and are secured thereto by means of a vertically disposed clevis pin 71 which may be in the form of a bolt as illustrated. The opposite ends of the tractor bar 70 are conventionally provided with pivot and draft pins 72 or the like which are mounted in the rearward ends of lifting arms 73 of the tractive vehicle T, which lifting arms 73 also serve as draft arms, their forward ends being attached, for this purpose, to studs 74 or the like conventionally secured to a lower portion of the tractor framework F and providing both a pivotal mounting for the forward ends of the litfing arms 73 as well as providing the necessary means for transmitting forward draft by way of the arms 73 and the tractor draw bar 70 to the implement being pulled. Any means such as cotter keys 72a (Fig. 1) may be employed to insure operative engagement of the rear ends of the lifting arms 73 with the pins 72 on the ends of the tractor draw bar 70.

As illustrated, the lifting arms 73 and the tractor draw bar 70 are controlled by the conventional power lift L which includes pull links 75 whose lower ends are pivotally attached to the lifting arms by means of suitable pivot pins 76 or the like and whose upper ends are actuated through the medium of universal joints 77 to lever arms 78 under the control of a hydraulically actuated mechanism conventionally contained within a housing 79 (Figs. 3 and 4). Such hydraulic means is in turn controlled by the driver of the tractive vehicle T in any conventional or preferred manner.

For the purpose of operating the elevating mechanism for the rear gang of discs 15 and the rearward harrow frame 21, a lever 80 is connected with the tractor draw bar 70 and the forward end of the tongue member 42 in such manner as to be actuated in accordance with the rising and falling movements of such forward end of the tongue member 42 and the tractor draw bar 70. In order properly to position the lever 80, so that it may properly actuate the elevating mechanism 41 and in turn be properly actuated, its middle portion is fulcrumed upon a fulcrum pin 82 carried in forwardly projecting ears 83 which are secured to the forward edge of a transversely disposed mounting bar 84 superimposed upon the tractor draw bar 70 and retained by the clevis pin 71 passing through a middle portion thereof, and further retained by means of bolts 85 which secure its ends to corresponding underlying portions of the tractor draw bar 70. Either the ends of the mounting bar 84 may be offset downward to compensate for the thickness of the upper bifurcation of the clevis 68, or appropriate spacing washers 86 (Fig. 1) may be used between the tractor draw bar 70 and the ends of the mounting bar 84. In any event, the clevis 68 is left sufficiently free to permit the necessary lateral swinging of the tongue structure 40 about the clevis pin 71. The actuating lever 80 is rocked about its fulcrum 82 as the lifting arms 73 and the tractor draw bar 70 are elevated, whereby to draw upon a chain or cable 88 which actuates the elevating mechanism 41 for the rearward harrow frame 21 and its discs 15. Preferably, one end of the cable 88 is adjustably attached, as by a detachable clamp 89, or is otherwise rendered adjustable, to accommodate varying conditions. In order to actuate the lever 80 in accordance with the movements of the lifting arms 73 under the influence of the power lift L, the lower end of the lever 80 is pivotally attached to the lower end of a control link 90 which extends upward and forward and is pivotally connected by a pivot pin 91 to a bracket 92 rigidly mounted upon an upper portion of the tractor frame F. Thus, as the power lift L is operated to raise the lifting arms 73 through the medium of the pull links 75, the control link 90 operates as a thrust member which forces the lower forward end of the lever 80 downward and rearward about the fulcrum 82 and moves the upper end of the lever 80 forward from the position of Fig. 3 to the position of Fig. 4, thus exerting draft upon the cable 88 to elevate the rearward harrow frame 21 at the same time that the forward harrow frame 20 is lifted through the medium of the tongue member 42. Under such conditions, the upper end of the lever 80 where the forward end of the cable 88 is attached lies substantially upon the axis of the clevis pin 71, so that turning movement of the tractive vehicle T about the clevis pin 71 does not affect the relationship between the top of the lever 80 and the axis of the clevis pin 71. Thus, the lifted parts are maintained substantially in any given relationship as the tractor turns for the purpose of turning the harrow.

As the cable 88 extends rearward from the upper end of the lever 80 to the elevating mechanism 41 it passes under a grooved roller 94 journalled in spaced standing ears of a bracket 95 affixed to the right end of the forward harrow frame 20. The rearward end of the cable 88 is attached to the upper end of a lever member 96 whose lower end is swingingly mounted by a pivot pin 97 between two upstanding brackets 98 which are welded to the rearwardly extending positioning arm 32 of the forward harrow frame 20. At an intermediate point of the lever member 96 a pivot pin 99 serves to attach the forward end of a jack screw 100 whose rearward end is conventionally received in an internally threaded sleeve 102 mounted in an appropriate bearing 104 on the rear rail of the rearward harrow frame 21 and adapted to be rotatably adjusted by a crank handle 105 to vary the effective length of the jack screw 100. A cross stud 106 extending between the brackets 98 and rearward of the lever member 96 acts to limit the rearward movement of the lever member 96 and retain it generally in an upright position during discing operations. If desired, the lever member may be notched as indicated at 108 where it engages with the cross stud 106. The cross stud 106 also serves to limit the penetration of the discs 15 and 16 into the earth, inasmuch as engagement of the lever 96 with the cross stud 106 maintains the relative relationship between the frames 20 and 21 for any given adjustment of the jack screw 100, substantially as illustrated in Fig. 3.

*Operation*

Whether the discs 15 and 16 are in their lowered or operative position, somewhat as illustrated in Fig. 3, or are in their elevated or transport position, somewhat as illustrated in Fig. 4, depends upon the position of the lifting arms 73 of the tractive vehicle T as determined by the power lift L through the lifting influence of the pull links 75. When the driver of the tractive vehicle T releases the power lift L to permit lowering of the lifting arms 73, the consequent lowering of the fulcrum pin 82 and the actuating lever 80 results in the movement of the lever 80 from the position of Fig. 4 to the position of Fig. 3 by reason of the resultant pull of the control link 90. Incident release of draft upon the cable 88 permits rearward movement of the lever member 96 and descent of the frame 21 with respect to the forward frame 20. The position of the tongue structure 40 controls the position of the forward harrow frame 20, lowering of the lifting arms 73 and the incident lowering of the tongue structure 40 resulting in the simultaneous lowering of the rearward discs 15 and the forward discs 16. The amount of penetration of the discs 15 and 16 into the earth, and the relative proportion of the weight of the structure borne by the ground wheels 10 and 12 are dependent upon the effective elongation of the jack screw 100 as established by the crank handle 105. The amount of play of the bolt 60 in the slot 59 of the slide bar 56, and the consequent free rise and fall of the discs 15 and 16 during normal discing operation, depend upon the length of the slot 59. Such free movement results in a hinging action about the hinge bolts 48 at the rear of the tongue structure 40 without, however, tending to produce rise and fall of the forward end of the tongue structure 40. In general, the front harrow frame 20 together with the weight of the harrow draw bar 43 and the rearward portion of the tongue structure 40 carried by the harrow are heavier than the rearward harrow frame 21, so that the tendency is for the forward harrow frame 20 to overbalance the rearward harrow frame 21. Thus, apart from the lifting action of the lifting arms 73, the forward harrow frame 20 tends to lift the rearward harrow frame 21 rather than the reverse.

When it is desired to lift the discs 15 and 16 from the position of Fig. 3 into a position such as illustrated in Fig. 4 either for the purpose of turning the harrow to the right or left or for transport purposes, the driver of the tractive vehicle T actuates the power lift L in a conventional manner whereby the pull links 75 are caused to elevate the lifting arms 73 and raise the tongue structure 40. The play of the bolt 60 normally permitted in the slot 59 is soon taken up by movement of the forward end of the slot 59 into engagement with the bolt 60, whereupon the forward end of the forward harrow frame 20 begins to rise and withdraw its discs 16 from the earth. At the same time, the elevation of the fulcrum pin 82 for the actuating lever 80 causes the control link 90 to become effective and thrust the lower end of the actuating lever rearward, whereupon the upper end of the actuating lever 80 is forced forward to exert draft on the cable 88 which operates through the lever member 96 to draw forward the jack screw 100 and thus lift the rear edge of the rearward harrow frame 21 and thereby withdraw the rear discs 15 from the soil. This operation places the parts in the position illustrated in Fig. 4, wherein they are in readiness for turning of the harrow or for transporting it from one place to another.

When the length of the jack screw 100 is increased for the purpose of discing deeper, it may be necessary to set the bolt 60 in a hole farther rearward on the end of the harrow frame 20 in order to provide for the normal rising and falling movements of the front discs without interfering with the connection of the forward end of the tongue structure 40 to the tractor draw bar 70.

It will be apparent that the present structure renders it feasible to offset the rearward discs 15 to the right beyond the right ground wheel 10 so that, by reason of swinging the harrow structure about the clevis pin 71 as the tractor is turned to the right, discing under trees may be effected when making turns on long arcs while leaving the discs in the ground, or at least at such depths as may be desired for that particular purpose.

Similarly, a reverse construction would be adapted to left turning. Of course, the structure shown is also adapted to left turning, with or without offsetting rear discs 15 to the left. In all instances proper height is maintained on turns by the automatic controls hereof. If desired, only the front gang of discs may be lifted through the tongue structure 40, in which case the cable 88 will be loosened through the adjustment or detachment of the clamp 89.

The automatically actuable push-pull type of linkage herein described and claimed is very efficient and is capable of actuating a 5¼ foot disc harrow of the type shown with ease and without hesitation in lifting. At the same time, no undue strain is imposed on the hydraulic lifting mechanism of the tractor.

Since variations of the genuine invention herein shown will become apparent to those skilled in this art, it is intended to cover such modifications as fall within the scope of the claims.

We claim as our invention:

1. An earth-working implement adapted to be drawn forward and comprising in combination: frame means provided with rearward earthworking tool means adapted to be elevated; tongue means secured to the forward portion of said implement; means on the forward end of said tongue means adapted for attachment to draft and power lift means of a tractive vehicle by which said implement is drawn and said tongue means is lifted; upstanding lever means pivotally mounted at the forward end of said tongue means; a pull connection between the upper end of said lever means and the rearward portion of said implement to lift said rearward portion; and force means connected with the lower end of said lever means and disposed for connection to said tractive vehicle whereby to swing said lever means and thereby actuate said pull means upon elevation of said lift means and tongue means.

2. A combination as in claim 1 wherein said force means is a push link connecting said lever means to an elevated part of said tractive vehicle.

3. A combination as in claim 1 wherein said lever means is mounted with respect to said draft and power lift means to position the connection of said lever means with said pull connection substantially in vertical alignment with the point of pivotal attachment of said draft means with said tongue means when said implement and tool means are elevated to withdraw the tool means from the earth.

4. A combination as in claim 1 wherein said tongue means is provided with lost motion means for attachment to said forward portion of said implement to provide for normal rise and fall of earthworking tools on said forward portion and to lift said forward portion upon predetermined lift of said forward end of said tongue.

5. An earthworking implement adapted to be drawn forward and comprising in combination: forward and rearward frames respectively carrying forward and rearward earthworking tools; horizontal hinge means connecting said frames and disposed transversely of the direction of travel; ground wheels disposed at opposite sides of said implement and supporting said frames adjacent said hinge means; means connected to said rearward frame and operable for swinging said rearward frame vertically upward about said hinge means to an angular position with respect to the other frame and thereby raise said rearward tools; draft means on said implement for connecting said implement to a tractive vehicle so as to be drawn thereby and lifted by a power lift on said vehicle to lift the forward portion of said forward frame; and actuating means connecting said draft means with said operable means to effect said swinging of said rearward frame upon elevation of said forward portion of said forward frame by said power lift, whereby to shift weight of said frames to said wheels.

6. A combination as in claim 5 wherein said actuating means includes lever means carried adjacent a forward portion of said draft means and elevatable therewith by said power lift, a control linkage connected to said lever means and adapted to be connected to said vehicle for moving said lever means as said forward portion of said draft means is elevated by said power lift, and means connecting said lever means with said operable means to actuate the latter.

7. A combination as in claim 6 wherein said lever means is mounted with respect to said draft means to have its connection with said operable means substantially in vertical alignment with the point of pivotal attachment of said draft means with said vehicle when said frames and their tools are elevated to withdraw the tools from the earth.

8. An implement as in claim 6 wherein said operable means connected to said rearward frame includes a member upstanding with respect to said rearward frame, and pull means connecting an upper portion of said upstanding member to a rear portion of said rearward frame to lift said rear portion from said actuating means.

9. In combination in an earthworking implement: a forward frame provided with forward earthworking tools; a rearward frame provided with rearward earthworking tools; horizontal hinge means disposed transversely of said implement and connecting said frames for respective vertical movement of said frames; ground wheels supporting said hinge means and adapted to sustain the weight of said frames and tools when said frames and tools are elevated upon said hinge means; tongue means connected with said forward frame and adapted for connection with lifting and draft means of a tractive vehicle whereby said tongue means, when lifted by said lifting means, lifts said forward frame; means connected with said rearward frame to swing the latter on said horizontal hinge means; means operatively connected with said tongue means and disposed for operative connection with said lifting means to lift said tongue means; and means connecting said frame swinging means and said tongue lifting means whereby said rearward frame is swung as said tongue means is raised and lowered.

10. A combination as in claim 9 wherein said means connected with said rearward frame includes: lever means mounted adjacent the forward end of said tongue means; a push link attached to said lever means and attachable to said tractive vehicle to exert thrust on said lever means as said tongue means is lifted; and pull means attached to said lever means and to said rearward frame for lifting the latter upon actuation of said lever means by thrust of said push link.

RUSSELL T. EVANS.
WILLIAM R. EVANS.
JOHN H. CLASEN.

REFERENCES CITED

The following references are of record in the file of this patent:

UNITED STATES PATENTS

| Number | Name | Date |
| --- | --- | --- |
| 1,900,525 | Silver | Mar. 7, 1933 |
| 2,337,801 | Cook | Dec. 28, 1943 |
| 2,413,807 | Warne | Jan. 7, 1947 |